April 15, 1969  J. D. HOUSTON  3,438,177
HANDGRIP ATTACHMENT FOR A SURCINGLE
Filed April 11, 1967  Sheet 1 of 2

JAMES D. HOUSTON
INVENTOR.

BY
Wayland D Keith
HIS AGENT

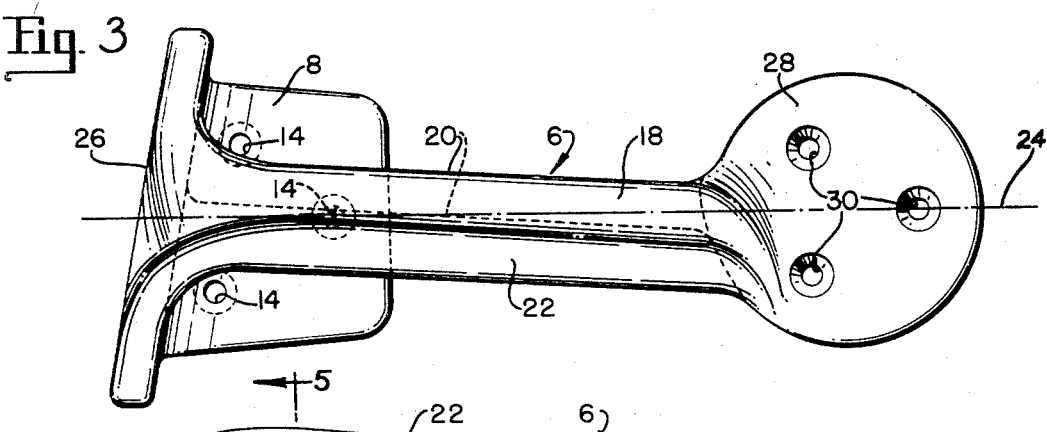
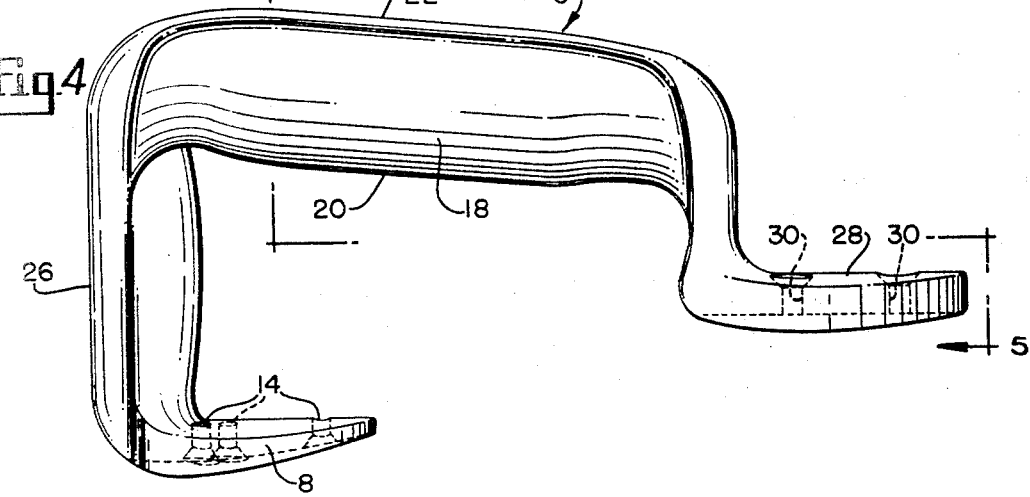
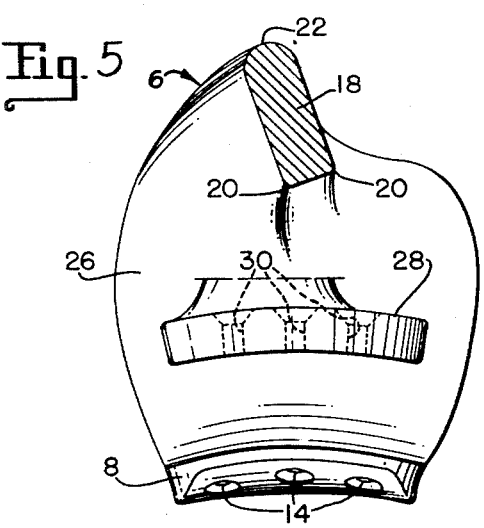
JAMES D. HOUSTON
*INVENTOR.*

United States Patent Office 3,438,177
Patented Apr. 15, 1969

3,438,177
HANDGRIP ATTACHMENT FOR A SURCINGLE
James D. Houston, Omaha, Nebr. (% Championship Rodeo Equipment, P.O. Box 23, Burkburnett, Tex. 76354)
Filed Apr. 11, 1967, Ser. No. 630,021
Int. Cl. B68c 1/00; A01k 15/00, 29/00
U.S. Cl. 54—23      8 Claims

ABSTRACT OF THE DISCLOSURE

A gripping handle for a surcingle, the hand gripping portion of which is so angulated in shape as to fit the hand of the bareback rider, and which handle is angulated with respect to the surcingle so as to give a natural gripping position to insure the bareback rider the firmest possible grip. The handle is formed of rigid molded material, which may be metal, plastic or other formaceous material, which will not yield under extreme conditions, such as bucking, which yielding would result in the bareback rider losing his grip and subsequently his seat.

---

This invention relates to improvements in riding equipment and more particularly to an angulated, rigid handle or handgrip device to be attached to a surcingle thereby enabling bareback riders to maintain their position on an animal, even though the animal should be of a character which would offer great resistance to the rider, as by bucking, pitching, running, and the like.

Various surcingles have been proposed heretofore to enable a rider to maintain a grip or handhold thereon to prevent the rider being thrown or otherwise dislocated from the animal.

An object of this invention is to provide an angulated, rigid handle for attachment to a surcingle, so as to enable a rider to grip a portion of the handle to maintain his position on the animal being ridden.

Another object of the invention is to provide an angulated, rigid handle which conforms in complementary relation with the gripping hand, so as to enable a firm grip to be had with a minimum of effort.

Still another object of the invention is to provide a handle for a surcingle which may be rigidly secured to the surcingle both to the upper face thereof and to the lower face thereof to minimize the strain on the handle and on the surcingles.

Still another object of the invention is to provide a rigid handle, for a surcingle, which handle has an enlarged flattened, hand-guard on the forward end thereof to prevent the hand from slipping forward of the hand grip portion of the device.

Another object of the invention is to provide an angulated, rigid handle device for a surcingle, which handle in addition to being angulated to complementally fit the inner portion of the hand when closed, is angulated with respect to a vertical plane passing transversely through the top portion of the surcingle.

With these objects in view and others that will become manifest as the description proceeds, reference is to be had to the accompanying drawings, in which:

FIG. 3 is an enlarged top plan view of the angulated, rigid handgrip device for a surcingle, showing a center line longitudinally therethrough so as to emphasize the angulated relation of the handgrip device with respect to the surcingle so as to give the correct longitudinal angle for the most comfortable and most secure grip by the hand on the rigid handgrip device when in use;

FIG. 4 is an enlarged side elevational view of the handgrip device as shown apart from a surcingle; and FIG. 5 is an enlarged sectional view taken on line 5—5 of FIG. 4 looking in the direction indicated by the arrows.

Figure 1:
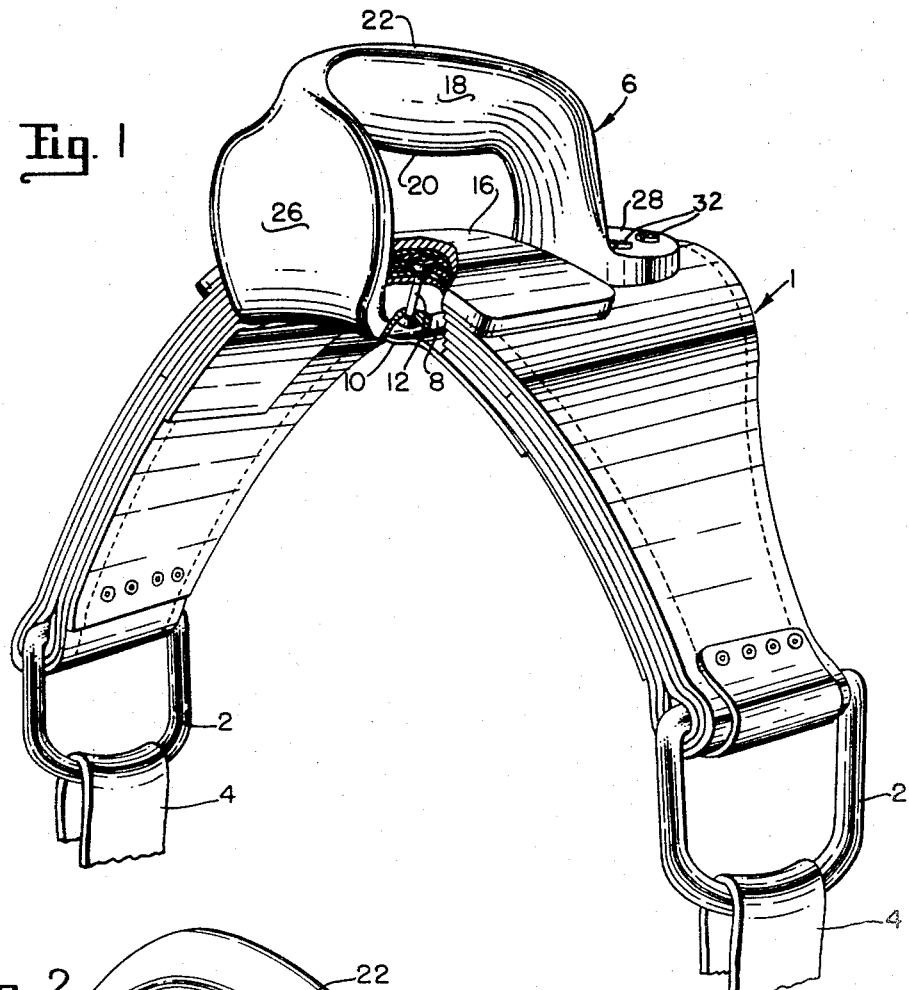
FIG. 1 is a perspective view of the top portion of a surcingle with the girt portion thereof being broken away, showing the angulated, rigid handgrip device or handle attached thereto, and showing the forward end and a side portion thereof in perspective.

With more detailed reference to the drawings the numeral 1 designates the top of the upper portion of a surcingle, which is usually made out of harness leather, or the like, and which has D-loops 2 secured to the lower ends thereof, as will best be seen in FIG. 1. Portions of cinch straps 4 are shown connected thereto, which cinch straps connect to girts (not shown) in a manner well understood in the art of saddles and surcingles. The top portion 1 of the surcingle has an angulated, rigid handgrip device or handle generally designated by the numeral 6, in position thereon, as shown in FIG. 1 which handgrip device has a forward re-entrant portion 8 extending beneath the upper portion of the surcingle, with a skived or padded portion 10 of the surcingle receiving the re-entrant portion 8, with screws or rivets 12 passing through holes 14 in the re-entrant portion 8 and up through surcingle portion 1, as will best be seen in FIG. 1.

A padding, such as sheepskin, sponge rubber, or the like 16 covers the upper ends of the rivets or screws below a longitudinal handgrip portion 18 so as to prevent injury to the hand. The longitudinal portion 18 of the handgrip device may be angulated, as shown in FIG. 5, so it may be grasped with the particular hand of the bareback rider; that is, for a left hand rider, the handgrip portion 18 will be angulated substantially as shown in FIG. 5; however, for a right hand rider, the handle portion 18 will be angulated in the opposite direction with respect to a vertical plane. The lower corners 20 of the portion 18 have a very small radius, so as to minimize the possibility of injury to the hand; however, the fact that the angles are nearly square, or nearly right angles, prevents a slipping action in the hand. However, the upper surface 22 of the portion 18 is rounded to prevent injury to the hand. The longitudinal grip portion 18 is angulated to be complemenetary to the particular hand used by the person using the surcingle. If a left handed person uses the surcingle, the longitudinal angle will be so canted as to minimize the twist on the wrist, while gripping the hand grip portion 18, as is best emphasized by the center line 24 passing longitudinally through the handgrip portion 18, as shown in FIG. 3. However, for individuals who use the right hand in bare-back riding, these angles will be reversed.

Figure 2:
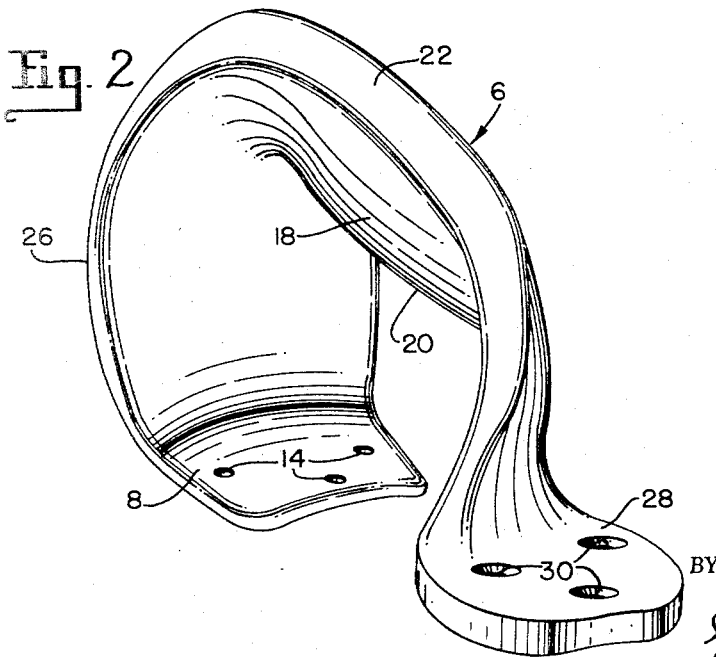
FIG. 2 is a perspective view showing the opposite end and the inside of the handgrip device shown apart from the surcingle.

The forward end of the handgrip portion 18 has transition curves into a hand guard portion 26 which prevents the hand from slipping off of the forward end of the portion 18 or becoming pinched due to the hand moving thereagainst. The hand guard 26 connects the handgrip portion 18 and the re-entrant portion 8, as will best be seen in FIG. 2. The rear end of the handgrip 18 has transition curves, as will best be seen in FIGS. 2, 3, and 4, into a rear anchor portion 28, which rear anchor portion has holes 30 therein, through which holes, rivets, or screws 32 pass and through the surcingle portion 1 to hold the handle in secure relation on the surcingle.

While the invention has been illustrated and described in one embodiment thereof, it is to be understood that changes may be made in the details of construction and adaptations may be made to different installations without departing from the spirit of the invention.

Having thus clearly shown and described the invention, what is claimed as new and desired to be secured by Letters Patent is:

1. A handgrip device for attachment for a surcingle, which surcingle is used on an animal to aid a rider to maintain his seat while riding the animal bareback, which device comprises:
   - (a) a longitudinal handgrip portion on said handgrip device,
     - (1) said longitudinal handgrip portion being downwardly angulated with respect to a longitudinal vertical plane passing therethrough,
   - (b) standards depending from end portions of said longitudinal handgrip portion,
   - (c) an apertured, reentrant surcingle engaging portion connected to the lower end of one of said depending standards and extending a spaced distance therefrom and in the same general direction as said longitudinal handgrip portion, and
   - (d) the other of said depending standards having a flat rearwardly extending apertured surcingle engaging base formed on the lower end thereof.

2. A device for attachment to a surcingle, as defined in claim 1; wherein
   - (a) said re-entrant portion is adapted to extend beneath the surcingle,
     - (1) fastening means adapted to extend through the apertures of said re-entrant portion and through the surcingle,
   - (b) said apertured base on the other of said standards adapted to seat upon the surcingle, and
     - (1) fastening means adapted to extend through the apertures in said base and through the surcingle, to secure said handgrip device to the surcingle.

3. A device for attachment to a surcingle, as defined in claim 1; wherein
   - (a) said angulated handgrip portion being at an acute angle with respect to a vertical plane, and
     - (1) the lower side of said angulated handgrip portion being flattened.

4. A device for attachment to a surcingle, as defined in claim 1; wherein
   - (a) said longitudinal handgrip portion being angulated with respect to a transverse plane passing through said surcingle.

5. A handgrip device for attachment to a surcingle, as definde in claim 1; wherein
   - (a) said handgrip device is formed of rigid material.

6. A handgrip device for a surcingle, as defined in claim 5; wherein
   - (a) said handgrip device is rigidly attached to the surcingle.

7. A handgrip device for attachment to surcingle, as defined in claim 1; wherein
   - (a) said handgrip device is molded of a material which is not yieldable in the hand of the bareback rider.

8. A handgrip device for attachment to a surcingle, as defined in claim 1; wherein
   - (a) said handgrip device is molded of a metallic material, which is not yieldable in the hand of a bareback rider.

References Cited

UNITED STATES PATENTS

| | | | |
|---|---|---|---|
| 428,268 | 5/1890 | Caldwell | 296—71 |
| 1,436,777 | 11/1922 | Ridenour | 54—23 |
| 2,258,252 | 10/1941 | Lang | 174—46 |
| 2,279,731 | 4/1942 | Braun | 38—90 |
| 2,799,102 | 7/1957 | Schott | 38—90 |
| 2,826,172 | 3/1958 | Buckle et al. | 119—109 X |
| 2,901,584 | 8/1959 | Finlayson | 219—25 |
| 2,956,541 | 10/1960 | Rall | 119—96 |
| 3,165,168 | 1/1965 | Rose | 182—3 |

FOREIGN PATENTS 1,173,416  10/1958  France.

ALDRICH F. MEDBERRY, *Primary Examiner.*

U.S. Cl. X.R.

38—90; 54—71; 119—29